(12) United States Patent
Gao (10) Patent No.: US 12,038,642 B2
(45) Date of Patent: Jul. 16, 2024

(54) DISPLAY PANEL

(71) Applicant: Shenzhen China Star Optoelectronics Semiconductor Display Technology Co., Ltd., Guangdong (CN)

(72) Inventor: Rong Gao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 437 days.

(21) Appl. No.: 17/414,078

(22) PCT Filed: Apr. 30, 2021

(86) PCT No.: PCT/CN2021/091625
§ 371 (c)(1),
(2) Date: Jun. 15, 2021

(87) PCT Pub. No.: WO2022/217669
PCT Pub. Date: Oct. 20, 2022

(65) Prior Publication Data
US 2023/0359079 A1    Nov. 9, 2023

(30) Foreign Application Priority Data
Apr. 13, 2021  (CN) .......................... 202110393699.2

(51) Int. Cl.
*G02F 1/1335* (2006.01)
*G02F 1/1339* (2006.01)
(52) U.S. Cl.
CPC .... *G02F 1/133512* (2013.01); *G02F 1/13394* (2013.01); *G02F 1/13396* (2021.01)

(58) Field of Classification Search
CPC ..................................................... G02F 1/1335
See application file for complete search history.

(56) References Cited

U.S. PATENT DOCUMENTS

2014/0022478 A1    1/2014  Kim
2019/0369437 A1    12/2019 Wang et al.

FOREIGN PATENT DOCUMENTS

| CN | 103969883 | 8/2014 | |
| CN | 204832728 | * 12/2015 | ........... G02F 1/1339 |

(Continued)

OTHER PUBLICATIONS

International Search Report and the Written Opinion Dated Jan. 14, 2022 From the International Searching Authority Re. Application No. PCT/CN2021/091625 and Its Translation Into English. (18 Pages).

(Continued)

*Primary Examiner* — Sang V Nguyen (57) ABSTRACT

The present application discloses a display panel. The display panel is defined with a display region and a dummy region and include a first substrate and a second substrate. The first substrate comprises a first black matrix disposed in the display region and a second black matrix disposed in the dummy region. A thickness of the second black matrix is greater than a thickness of the first black matrix such that the dummy region of the first substrate forms a first thickened layer relative to the display region. The second substrate is disposed opposite to the first substrate. The present application can reduce a film thickness difference between the display region and the dummy region, weaken a seesaw effect, and improve poor display on a periphery of the display panel.

20 Claims, 3 Drawing Sheets

(56) References Cited

FOREIGN PATENT DOCUMENTS

| CN | 105489124 | * | 4/2016 | |
|----|-----------|---|--------|---|
| CN | 106526955 |   | 3/2017 | |
| CN | 109298590 |   | 2/2019 | |
| CN | 105489124 | * | 6/2019 | ........... G02F 1/1333 |
| CN | 110716342 |   | 1/2020 | |
| CN | 110824786 |   | 2/2020 | |
| KR | 10-2014-0013325 | | 2/2014 | |
| TW | 201426100 |   | 7/2014 | |
| TW | 201044080 |   | 12/2020 | |

OTHER PUBLICATIONS

Notification of Decision of Rejection Dated Apr. 18, 2022 From The State Intellectual Property Office of the People's Republic of China Re. Application No. 202110393699.2 and Its Translation Into English. (10 Pages).

Notification of Office Action and Search Report Dated Nov. 3, 2021 From The State Intellectual Property Office of the People's Republic of China Re. Application No. 202110393699.2 and Its Translation Into English. (17 Pages).

* cited by examiner

DISPLAY PANEL

RELATED APPLICATIONS

This application is a National Phase of PCT Patent Application No. PCT/CN2021/091625 having International filing date of Apr. 30, 2021, which claims the benefit of priority of China Patent Application No. 202110393699.2 filed on Apr. 13, 2021. The contents of the above applications are all incorporated by reference as if fully set forth herein in their entirety.

FIELD AND BACKGROUND OF THE INVENTION

The present application relates to a field of display technologies, especially to a display panel.

A liquid crystal display (LCD) panel is formed by encapsulating an upper substrate and a lower substrate in a cell, and liquid crystals are filled between the upper substrate and the lower substrate. Liquid crystals are filled between the upper substrate and the lower substrate. A cell gap of the liquid crystal layer (also called cell thickness) is mainly controlled through post spacers (PSs) disposed between the upper substrate and the lower substrate.

Figure 1:
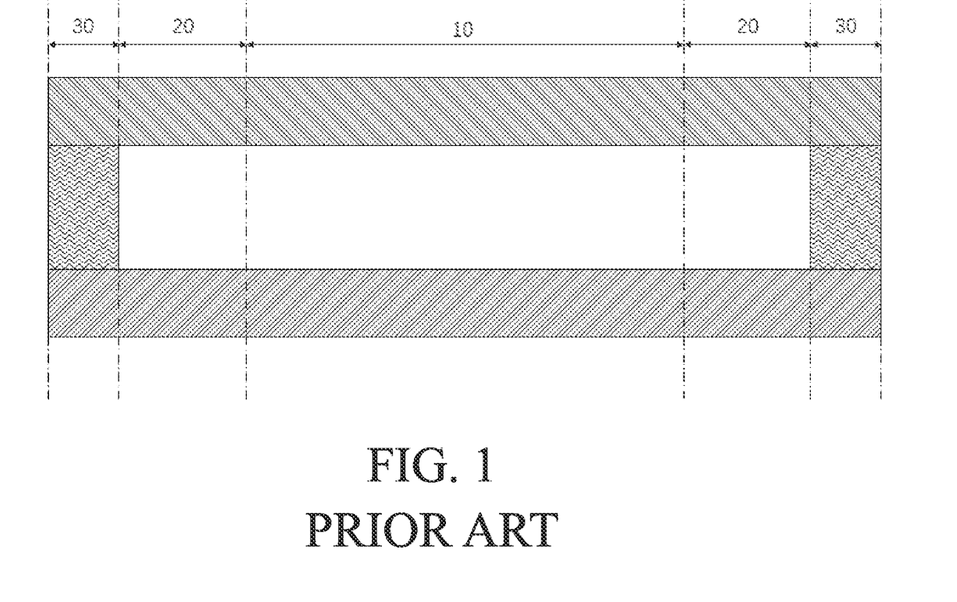
FIG. 1 is a schematic structural view of different regions of a conventional liquid crystal display panel.

With reference to FIG. 1, the liquid crystal display panel is defined with a display region (Active Area, AA) 10 and a non-display region, the non-display region comprises a dummy region 20 (AA-Sealant, and is also called dummy region) and an encapsulation region 30 (Sealant). An excessive total step difference between film thicknesses of the display region 10 and the dummy region 20 would result in a seesaw effect to cause poor display (mura) on a periphery of the display panel, for example, uneven chroma, uneven brightness. Specifically, for example, for color resist (RGB) direct splicing products, color resists cannot be manufactured in the dummy region 20 due to process limitations such that the display region 10 is disposed with color resists but the dummy region 20 is disposed without color resists, which further results in a difference in film thicknesses of the display region 10 and the dummy region 20. The total film thickness step difference between the display region 10 and the dummy region 20 increases and results in an increased risk of poor display on a periphery of the display panel.

Therefore, the issue is how to reduce the film thickness step difference between the display region and the dummy region to improve the poor display on the periphery of the display panel.

SUMMARY OF THE INVENTION

Technical Issue

An embodiment of the present application provides a display panel, which can reduce a difference between film thicknesses of a display region and a dummy region, decrease a seesaw effect, and improve poor display on a periphery of the display panel.

Technical Solution

In a first aspect, the embodiment of the present application provides a display panel, defined with a display region, an encapsulation region, and a dummy region located between the display region and the encapsulation region, and comprising:

a first substrate comprising a first black matrix disposed in the display region and a second black matrix disposed in the dummy region, wherein a thickness of the second black matrix is greater than a thickness of the first black matrix such that the dummy region of the first substrate forms a first thickened layer relative to the display region;

a second substrate disposed opposite to the first substrate; and a post spacer layer, wherein the post spacer layer is disposed between the first substrate and the second substrate, and comprises at least one first main post spacer disposed in the display region and at least one second main post spacer disposed in the dummy region;

wherein the display panel further comprises a color resist layer, the color resist layer is disposed in the display region of the second substrate such that the display region of the second substrate forms a second thickened layer relative to the dummy region, and a thickness of the first thickened layer is less than or equal to a thickness of the second thickened layer.

Optionally, in some embodiments of the present application, a thickness of the first main post spacer is equal to a thickness of the second main post spacer.

Optionally, in some embodiments of the present application, a sum of a.

Optionally, in some embodiments of the present application, the post spacer layer further comprises at least one first auxiliary post spacer disposed in the display region and/or at least one second auxiliary post spacer disposed in the dummy region; a thickness of the first auxiliary post spacer is less than a thickness of the first main post spacer, and a thickness of the second auxiliary post spacer is less than a thickness of the second main post spacer.

Optionally, in some embodiments of the present application, the post spacer layer is disposed on the first substrate or disposed on the second substrate.

In a second aspect, the embodiment of the present application provides a display panel, defined with a display region, an encapsulation region, and a dummy region located between the display region and the encapsulation region, and comprising:

a first substrate comprising a first black matrix disposed in the display region and a second black matrix disposed in the dummy region, wherein a thickness of the second black matrix is greater than a thickness of the first black matrix such that the dummy region of the first substrate forms a first thickened layer relative to the display region;

a second substrate disposed opposite to the first substrate; and a post spacer layer, wherein the post spacer layer is disposed between the first substrate and the second substrate, and comprises at least one first main post spacer disposed in the display region and at least one second main post spacer disposed in the dummy region;

wherein the display panel further comprises a color resist layer, the color resist layer is disposed on the first substrate, and is disposed with the first black matrix on a same layer, a thickness of the color resist layer is greater than a thickness of the first black matrix such that the color resist layer forms a third thickened layer relative to the first black matrix, and a thickness of the first thickened layer is less than or equal to a thickness of the third thickened layer.

Optionally, in some embodiments of the present application, a thickness of the first main post spacer is equal to a thickness of the second main post spacer.

Optionally, in some embodiments of the present application, a sum of a thickness of a display region of the first substrate, a thickness of the first main post spacer, and a thickness of a display region of the second substrate is equal to a sum of a thickness of a dummy region of the second substrate, a thickness of the main post spacer, and the thickness of a dummy region of the second substrate.

Optionally, in some embodiments of the present application, the post spacer layer further comprises at least one first auxiliary post spacer disposed in the display region and/or at least one second auxiliary post spacer disposed in the dummy region; a thickness of the first auxiliary post spacer is less than a thickness of the first main post spacer, and a thickness of the second auxiliary post spacer is less than a thickness of the second main post spacer.

Optionally, in some embodiments of the present application, the post spacer layer is disposed on the first substrate or disposed on the second substrate.

In a third aspect, the embodiment of the present application provides a display panel, defined with a display region, an encapsulation region, and a dummy region located between the display region and the encapsulation region, and comprising:

a first substrate comprising a first black matrix disposed in the display region and a second black matrix disposed in the dummy region, wherein a thickness of the second black matrix is greater than a thickness of the first black matrix such that the dummy region of the first substrate forms a first thickened layer relative to the display region; and a second substrate disposed opposite to the first substrate.

Optionally, in some embodiments of the present application, the display panel comprises a color resist layer, and the color resist layer is disposed in the display region.

Optionally, in some embodiments of the present application, the color resist layer is disposed in the display region of the second substrate such that the display region of the second substrate forms a second thickened layer relative to the dummy region.

Optionally, in some embodiments of the present application, a thickness of the first thickened layer is less than or equal to a thickness of the second thickened layer.

Optionally, in some embodiments of the present application, the color resist layer is disposed on the first substrate, and is disposed with the first black matrix on a same layer, a thickness of the color resist layer is greater than a thickness of the first black matrix such that the color resist layer forms a third thickened layer relative to the first black matrix.

Optionally, in some embodiments of the present application, a thickness of the first thickened layer is less than or equal to a thickness of the third thickened layer.

Optionally, in some embodiments of the present application, the display panel further comprises a post spacer layer, the post spacer layer is disposed between the first substrate and the second substrate, and comprises at least one first main post spacer disposed in the display region and at least one second main post spacer disposed in the dummy region.

Optionally, in some embodiments of the present application, a thickness of the first main post spacer is equal to a thickness of the second main post spacer.

Optionally, in some embodiments of the present application, a sum of a thickness of a display region of the first substrate, a thickness of the first main post spacer, and a thickness of a display region of the second substrate is equal to a sum of a thickness of a dummy region of the second substrate, a thickness of the main post spacer, and the thickness of a dummy region of the second substrate.

Optionally, in some embodiments of the present application, the post spacer layer is disposed on the first substrate or disposed on the second substrate.

Advantages

Compared to the prior art, the embodiment of the present application, by changing a thickness of the black matrix of the dummy region, makes the thickness of the black matrix of the dummy region greater than thickness of the black matrix of the display region such that the film thickness difference existing between the display region and the dummy region can be balanced, for example the film thickness difference generated due to the display region disposed with a color resist layer but the dummy region disposed without the color resist layer, such that a seesaw effect resulting from the excessive cell thickness difference between the display region and the dummy region is weakened to improve the poor display of the periphery of the display panel.

DESCRIPTION OF SPECIFIC EMBODIMENTS OF THE INVENTION

The embodiment of the present application provides a liquid crystal display panel. Respective detailed descriptions are as follows. It should be explained that the order of descriptions in the following embodiments is not to limit the preferred order of the embodiments.

The embodiment of the present application provides a display panel. Respective detailed descriptions are as follows. It should be explained that the order of descriptions in the following embodiments is not to limit the preferred order of the embodiments.

With reference to FIGS. 2 to 5, the embodiments of the present application provide a display panel defined with a display region 10, an encapsulation region 30 disposed around an outer periphery of the display region 10, and a dummy region 20 located between the display region 10 and the encapsulation region 30. The display panel comprises a first substrate 100 and a second substrate 200.

The first substrate 100 comprises a black matrix layer 120, the black matrix layer 120 comprises a first black matrix 121 disposed in the display region 10 and a second black matrix 122 disposed in the dummy region 20. A thickness of the second black matrix 122 is greater than a thickness of the first black matrix 121 such that the dummy region 20 of the first substrate 100 forms a first thickened layer 130 relative to the display region 10.

Specifically, the first black matrix 121 of the display region 10 and the second black matrix 122 of the dummy region 20 are disposed in a same layer. The first black matrix 121 and the second black matrix 122 can be manufactured by a same process. Because an area of the black matrix layer 120 is greater, and the region (i.e., the second black matrix 122) required to control the thickness is integral and has a greater area, a layer of transmittance changing material or sheet can be used to cover a corresponding region of a halftone mask (HF Mask) to achieve manufacturing of a black matrix with different thicknesses.

The second substrate 200 is disposed opposite to the first substrate 100 such that the second substrate 200 and the first substrate 100 form a cell, and liquid crystals are filled in a gap in the cell of the display region 10 to achieve a display function of the display panel.

In some embodiments of the present application, the display panel further comprises a color resist layer 300, the color resist layer 300 is disposed in the display region 10. It can be understood that the dummy region 20 is not disposed with a color resist layer 300.

A thickness of a black matrix of a conventional display region 10 is same as a thickness of a black matrix of a dummy region 20. The embodiment of the present application, by changing a thickness of the second black matrix 122 of the dummy region 20, makes the thickness of the second black matrix 122 of the dummy region 20 greater than thickness of the first black matrix 121 of the display region such that a difference in the film layer thickness existing between the display region 10 and the dummy region 20 can be balanced, for example the film thickness difference generated due to the display region 10 disposed with a color resist layer 300 but the dummy region 20 disposed without the color resist layer 300, such that a seesaw effect resulting from the excessive cell thickness difference between the display region 10 and the dummy region 20 is weakened to improve the poor display (mura) of the periphery of the display panel.

In some embodiments of the present application, the first substrate 100 further comprises a first underlay 110, and the black matrix layer 120 is disposed on a side of the first underlay 110 near the second substrate 200.

In some embodiments of the present application, the second substrate 200 thin film transistor (thin film transistor, TFT) array substrate. The second substrate 200 comprises a second underlay 210 and a function layer 220. The function layer 220 comprises a first function layer 221 and a second function layer 222. The first function layer 221 is located in the display region 10. The second function layer 222 is located in the dummy region 20. The first function layer 221 and the second function layer 222 are, for example, a TFT function layer. In some embodiments of the present application, a thickness of the first function layer 221 is same as a thickness of the second function layer 222.

In some embodiments of the present application, the display panel further comprises a post spacer layer 400, and the post spacer layer 400 is disposed between the first substrate 100 and the second substrate 200. The post spacer layer 400 comprises at least one first main post spacer 410 disposed in the display region 10 and at least one second main post spacer 420 disposed in the dummy region 20. Specifically, at least the first main post spacer 410 simultaneously contacts a surface of the first substrate 100 and a surface of the second substrate 200 for supporting the first substrate 100 and the second substrate 200. The first main post spacer 410 and the second main post spacer 420 can be for example columnar post spacers, and can be post spacers of other shapes. The second main post spacer 420 can simultaneously contact the surface of the first substrate 100 and the surface of the second substrate 200, and can also only contact the surface of the first substrate 100 or the second substrate 200. In some embodiments of the present application, a thickness of the first main post spacer 410 is equal to a thickness of the second main post spacer 420.

In some embodiments of the present application, the post spacer layer 400 further comprises at least one first auxiliary post spacer 440 disposed in the display region 10 and/or at least one second auxiliary post spacer 450 disposed in the dummy region 20. A thickness of the first auxiliary post spacer 440 is less than the thickness of the first main post spacer 410, and/or a thickness of the second auxiliary post spacer 450 is less than the thickness of the second main post spacer 420. When the first substrate 100 and the second substrate 200 move close to each other under an action of an external force such that the first auxiliary post spacer 440 and/or the second auxiliary post spacer 450 simultaneously contact the first substrate 100 and the second substrate 200, the first auxiliary post spacer 440 and/or the second auxiliary post spacer 450 can perform an auxiliary support function. The first auxiliary post spacer 440 and the second auxiliary post spacer 450 can be for example columnar post spacers, and of course can be post spacers of other shapes. In some embodiments of the present application, a thickness of the first auxiliary post spacer 440 is the same as a thickness of the second auxiliary post spacer 450. As such, both can be manufactured by the same process.

The display panel is further provided with an encapsulation sealant layer 500 between the encapsulation region 30 of the first substrate 100 and the encapsulation region 30 of the second substrate 200 to encapsulate the first substrate 100 and the second substrate 200 to form a cell.

In some embodiments of the present application, the first substrate 100 further comprises a third black matrix 123 disposed in the encapsulation region 30. In some embodiments of the present application, the first black matrix 121 of the display region 10, the second black matrix 122 of the dummy region 20, and the third black matrix 123 of the encapsulation region 30 are disposed in a same layer. Therefore, the first black matrix 121, the second black matrix 122, and the third black matrix 123 can be manufactured by a same process.

In some embodiments of the present application, a thickness of the third black matrix 123 is equal to a thickness of the first black matrix 121. As such, when manufacturing the black matrix layer 120, a region of a halftone mask (HF Mask) corresponding to the third black matrix 123 needs no special design, which makes the process simpler.

In some embodiments of the present application, a third main post spacer 430 is disposed in the encapsulation sealant layer 500. The third main post spacer 430 can be for example a ball-like post spacer, specifically for example a silicon ball. The third main post spacer 430 can perform a function supporting or aid in supporting the first substrate 100 and the second substrate 200.

The first thickened layer 130 configured to balance a film thickness difference resulting from the color resist layer 300 disposed in the display region 10 instead of the dummy region 20 will be taken as an example for detailed descriptions as follows. It can be understood that the first thickened layer 130 is not only used to balance the film thickness difference resulting from the color resist layer 300, but can also be used to balance film thickness difference between other film layers.

Figure 2:
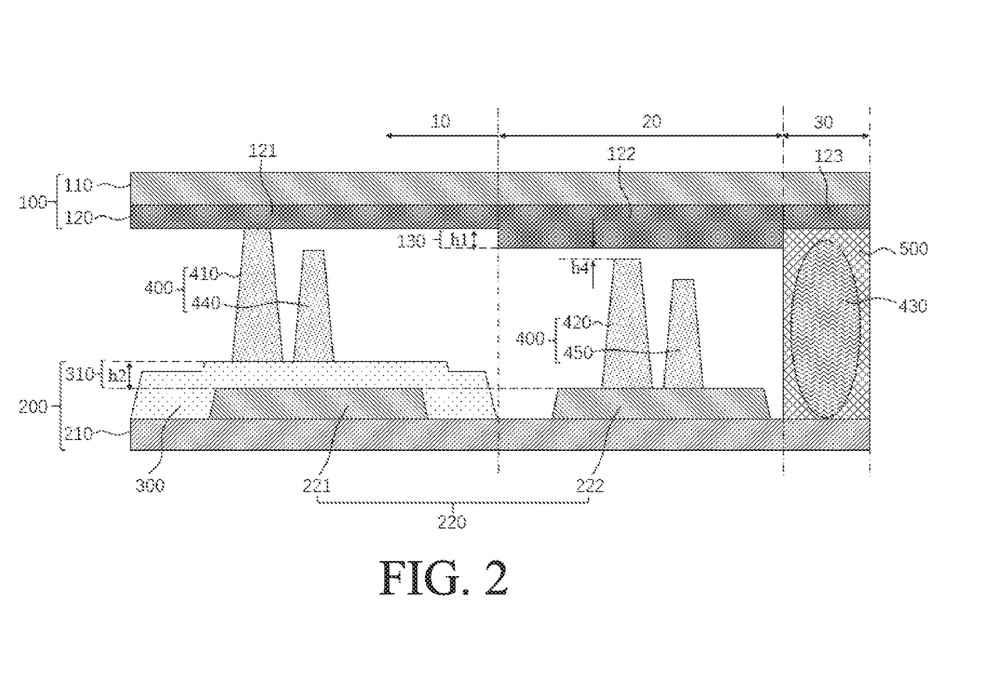
FIG. 2 is a schematic structural view of film layers of a display panel provided by a first embodiment of the present application.
Figure 3:
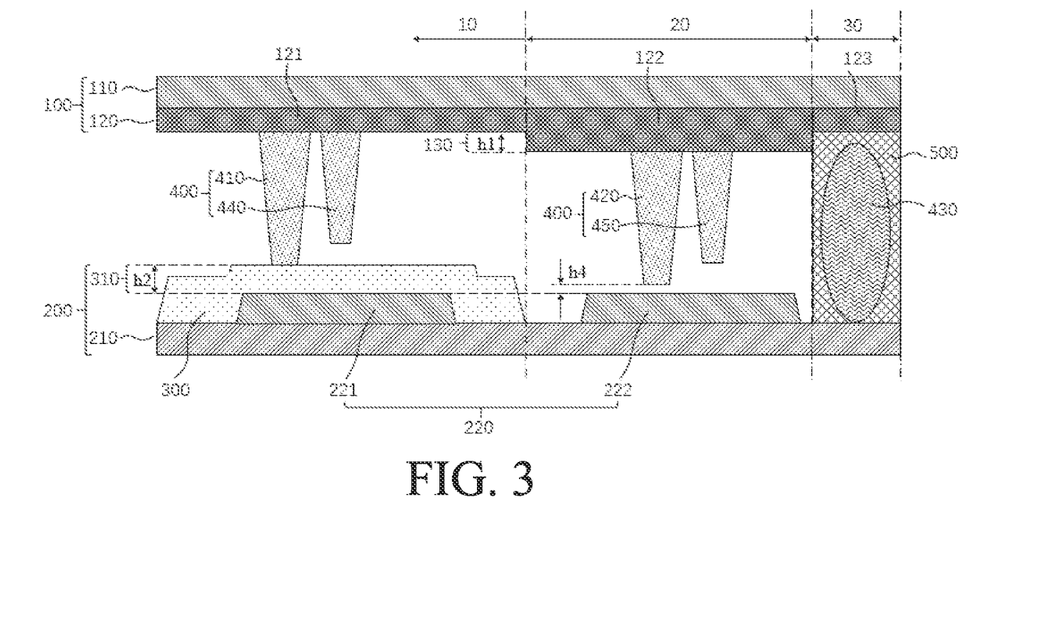
FIG. 3 is a schematic structural view of film layers of another display panel provided by the first embodiment of the present application.

With reference to FIGS. 2 and 3, FIGS. 2 and 3 illustrate film layer schematic structural views of a display panel of a first embodiment of the present application. The color resist layer 300 is disposed in the display region 10 of the second substrate 200 such that the display region 10 of the second substrate 200 forms a second thickened layer 310 relative to the dummy region 20. In some embodiments of the present application, the color resist layer 300 is disposed on the first function layer 221. In the embodiment of the present application the first thickened layer 130 can balance the film thickness difference resulting from the second thickened layer 310.

In some embodiments of the present application, the thickness h1 of the first thickened layer is equal to a thickness h2 of the second thickened layer. As such, a film thickness difference (i.e., a thickness h2 of the second thickened layer as shown in FIGS. 2 and 3) resulting from the display region 10 where the color resist layer 300 is disposed and the dummy region 20 disposed where the color resist layer 300 is not disposed can be completely balanced through the first thickened layer 130 to further reduce a total film thickness difference between the display region 10 and the dummy region 20, weaken the seesaw effect, and drastically mitigate periphery mura. At this time, except for the condition that a total film thickness of other film layers other than the black matrix layer 120 and the color resist layer 300 in the display region 10 is the same as a total film thickness thereof in the dummy region 20, h4 as shown in FIGS. 2 and 3 is equal to zero. Thus, two ends of the second main post spacer 420 located in the dummy region 20 contact the first substrate 100 and the second substrate 200 respectively.

Furthermore, considering that in the actual application process, a total film thickness of the display region 10 and a certain difference existing between a total film thickness of the dummy region 20 is tolerable, and the difference would not cause a serious seesaw effect and serious periphery mura when the first substrate 100 and the second substrate 200 move close to each other under an external force. Therefore, in some embodiments of the present application, a thickness h1 of the first thickened layer can also be less than a thickness h2 of the second thickened layer. At this time, except for the condition that a total film thickness of other film layers other than the black matrix layer 120 and the color resist layer 300 in the display region 10 is same as a total film thickness thereof in the dummy region 20, h4 shown in FIGS. 2 and 3 is greater than zero. Thus, an end of the second main post spacer 420 located in the dummy region 20 contacts the first substrate 100 (or the second substrate 200), and another end has no contact with the first substrate 100 (or the second substrate 200).

In some embodiments of the present application, a difference between a thickness h2 of the second thickened layer and a thickness h1 of the first thickened layer (for example, h4 as shown in FIGS. 2 and 3) is not greater than a predetermined threshold value. It should be explained that the predetermined threshold value can be set depending on the actual needs to fulfill a condition that a serious seesaw effect and serious poor display of the periphery of the display panel would not occur when a difference between the thickness h2 of the second thickened layer and the thickness h1 of the first thickened layer is below the predetermined threshold value (including predetermined threshold value).

In some embodiments of the present application, with reference to FIG. 2, the post spacer layer 400 is disposed on the second substrate 200. Specifically, the first main post spacer 410, the second main post spacer 420, the first auxiliary post spacer 440, and the second auxiliary post spacer 450 are disposed on the surface of a side of the second substrate 200 near the first substrate 100.

In some embodiments of the present application, as shown in FIG. 3, the post spacer layer 400 is disposed on the first substrate 100. Specifically, the first main post spacer 410, the second main post spacer 420, the first auxiliary post spacer 440, and the second auxiliary post spacer 450 are disposed on the surface of a side of the first substrate 100 near the second substrate 200.

In some embodiments of the present application, a sum of a thickness of the display region 10 of the first substrate 100 and a thickness of the display region 10 of the second substrate 200 is equal to a sum of a thickness of the dummy region 20 of the first substrate 100 and a thickness of the dummy region 20 of the second substrate 200.

In some embodiments of the present application, a sum of the thickness of the display region 10 of the first substrate 100, the thickness of the first main post spacer 410, and the thickness of the display region 10 of the second substrate 200 is equal to a sum of the thickness of the dummy region 20 of the first substrate 100, a thickness of the second main post spacer 420, and the thickness of the dummy region 20 of the second substrate 200. As such, poor display of the periphery of the display panel due to a seesaw effect can be avoided better.

Figure 4:
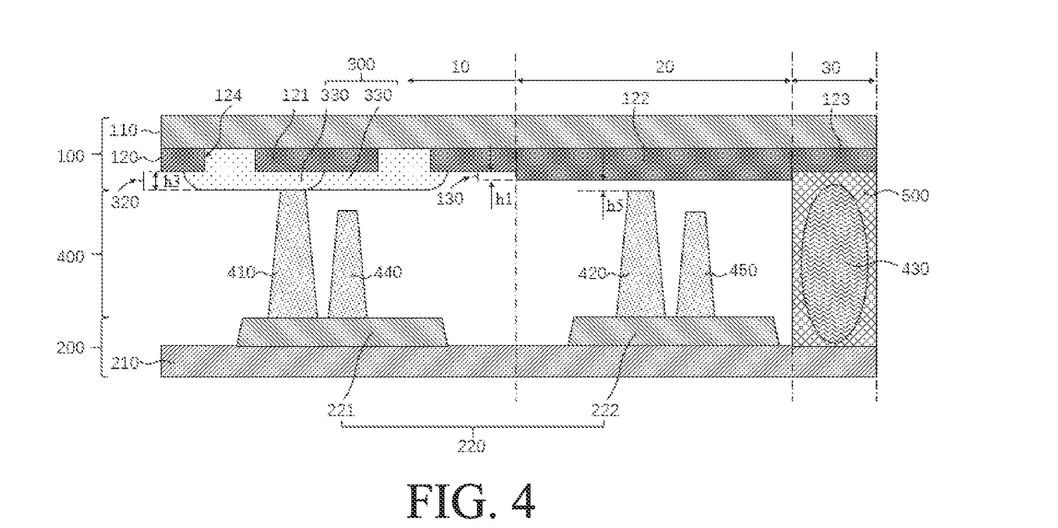
FIG. 4 is a schematic structural view of film layers of the display panel provided by a second embodiment of the present application.
Figure 5:
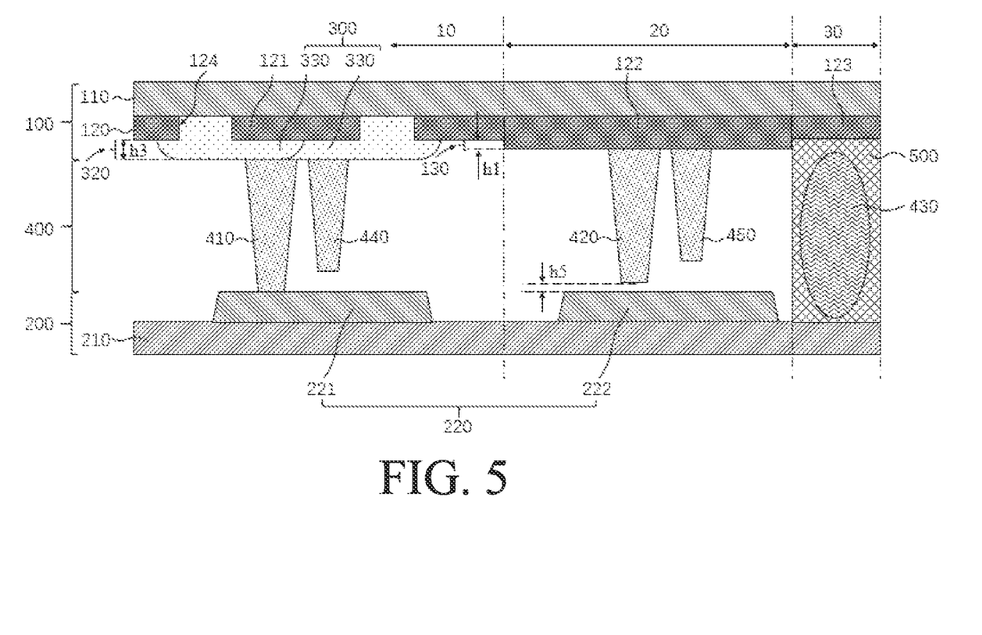
FIG. 5 is a schematic structural view of film layers of another display panel provided by the second embodiment of the present application.

With reference to FIGS. 4 and 5, FIGS. 4 and 5 illustrate film layer schematic structural views of the display panel of the second embodiment of the present application, the color resist layer 300 is disposed on the first substrate 100 and is disposed with the first black matrix 121 in the same layer. A thickness of the color resist layer 300 is greater than the thickness of the first black matrix 121 such that the color resist layer 300 forms a third thickened layer 320 relative to the first black matrix 121. The first thickened layer 130 in the embodiment of the present application can balance a film thickness difference resulting from the third thickened layer 320.

Specifically, with reference to FIGS. 4 and 5, the first black matrix 121 is defined with several through holes 124, the color resist layer 300 comprises several color resist units 330, the color resist units 330 are disposed in the through holes 124, and a thickness of each of the color resist units 330 is same. Furthermore, the thickness of the color resist layer 300 is greater than the thickness of the first black matrix 121 such that the color resist layer 300 forms a third thickened layer 320 relative to the first black matrix 121. The color resist units 330, for example, is a red color resist (R), a green color resist (G), or a blue color resist (B).

With reference to FIGS. 4 and 5, the first black matrix 121 of the display region 10 and the second black matrix 122 of the dummy region 20 are disposed in the same layer. The first black matrix 121 and the second black matrix 122 can be manufactured by the same process. Because an area of the black matrix layer 120 is greater, and the region (i.e., the second black matrix 122) required to control the thickness is integral and has a greater area, a layer of transmittance changing material or sheet can be used to cover a corresponding region of a halftone mask (HF Mask) to achieve manufacturing a black matrix with different thicknesses.

In some embodiments of the present application, the thickness h1 of the first thickened layer is equal to the thickness h3 of the third thickened layer. Thus, a film thickness difference (i.e., the thickness h3 of the third thickened layer as shown in FIGS. 4 and 5) resulting from the display region 10 disposed with the color resist layer 300 and the dummy region 20 disposed without the color resist layer 300 can be balanced completely through the first thickened layer 130 to further reduce the total film thickness difference between the display region 10 and the dummy region 20, weaken the seesaw effect, and drastically mitigate periphery mura. At this time, except for the condition that a total film thickness of other film layers other than the black matrix layer 120 and the color resist layer 300 in the display region 10 is the same as a total film thickness thereof in the dummy region 20, h5 as shown in FIGS. 4 and 5 is equal to zero such that two ends of the second main post spacer 420 of the dummy region 20 contact the first substrate 100 and the second substrate 200 respectively, which can better weaken the seesaw effect and drastically improve poor display of the periphery of the display panel.

Furthermore, considering that in the actual application process, a total film thickness of the display region 10 and a certain difference existing between a total film thickness of the dummy region 20 is tolerable, and the difference would not cause serious seesaw effect and serious periphery mura when the first substrate 100 and the second substrate 200 move close to each other under an external force. Therefore, in some embodiments of the present application, a thickness h1 of the first thickened layer can also be less than the thickness h3 of the third thickened layer. In the meantime, except for the condition that a total film thickness of other film layers other than the black matrix layer 120 and the color resist layer 300 in the display region 10 is the same as a total film thickness thereof in the dummy region 20, h5 shown in FIGS. 4 and 5 is greater than zero. Thus, an end of the second main post spacer 420 in the dummy region 20 contacts the first substrate 100 (or the second substrate 200), and another end has no contact with the first substrate 100 (or the second substrate 200). When the first substrate 100 and the second substrate 200 move close to each other under an external force, the second main post spacer 420 performs an auxiliary support function so serious seesaw effect and seriously poor display on the periphery of the display panel would not occur.

In some embodiments of the present application, a difference between the thickness h1 of the first thickened layer and a thickness h3 of the third thickened layer (for example, h5 shown in FIGS. 4 and 5) is not greater than a predetermined threshold value. It should be explained that the predetermined threshold value can be set depending on actual needs to fulfill a condition that serious seesaw effect and seriously poor display on the periphery of the display panel would not occur when a difference between the thickness h1 of the first thickened layer and a thickness h3 of the third thickened layer is below the predetermined threshold value (including the predetermined threshold value).

In some embodiments of the present application, with reference to FIG. 4, the post spacer layer 400 is disposed on the second substrate 200. Specifically, the first main post spacer 410, the second main post spacer 420, the first auxiliary post spacer 440, and the second auxiliary post spacer 450 are disposed on a surface of the side of the second substrate 200 near the first substrate 100.

In some embodiments of the present application, as shown in FIG. 5, the post spacer layer 400 is disposed on the first substrate 100. Specifically, the first main post spacer 410, the second main post spacer 420, the first auxiliary post spacer 440, and the second auxiliary post spacer 450 are disposed on a surface of the side of the first substrate 100 near the second substrate 200.

In some embodiments of the present application, the thickness of the display region 10 of the first substrate 100 is the same as the thickness of the dummy region 20. The thickness of the first function layer 221 is same as the thickness of the second function layer 222.

In some embodiments of the present application, a sum of the thickness of the display region 10 of the first substrate 100 and of the thickness of the display region 10 of the second substrate 200 is equal to a sum of the thickness of the dummy region 20 of the first substrate 100 and the thickness of the dummy region 20 of the second substrate 200.

In some embodiments of the present application, a sum of the thickness of the display region 10 of the first substrate 100, a thickness of the first main post spacer 410, and the thickness of the display region 10 of the second substrate 200 is equal to a sum of the thickness of the dummy region 20 of the first substrate 100, a thickness of the second main post spacer 420, and the thickness of the dummy region 20 of the second substrate 200.

The embodiment of the present application further provides a display device, the display device comprises any one of the display panels as described above.

It should be explained that, film layer thickness relating to each embodiment of the above the present application refers to a film layer thickness along a direction perpendicular to the substrate (for example, the first substrate 100, the second substrate 200) on which film layers located. Furthermore, the embodiment of the present application the display panel can further comprise other film layers according to demands, for example, an ITO film layer or an alignment film, and thicknesses of others film layers on the display region 10 and the dummy region 20 can be same.

In the above-mentioned embodiments, the descriptions of the various embodiments are focused. For the details of the embodiments not described, reference may be made to the related descriptions of the other embodiments.

The display panel provided by the embodiments of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present the idea of application, changes will be made in specific embodiment and application. In summary, the contents of this specification should not be construed as limiting the present application.

What is claimed is:

1. A display panel defined with a display region, an encapsulation region, and a dummy region located between the display region and the encapsulation region, comprising:
a first substrate comprising a first black matrix disposed in the display region and a second black matrix disposed in the dummy region, wherein a thickness of the second black matrix is greater than a thickness of the first black matrix such that the dummy region of the first substrate forms a first thickened layer relative to the display region;
a second substrate disposed opposite to the first substrate; and
a post spacer layer, wherein the post spacer layer is disposed between the first substrate and the second substrate, and comprises at least one first main post spacer disposed in the display region and at least one second main post spacer disposed in the dummy region;
wherein the display panel further comprises a color resist layer, the color resist layer is disposed in the display region of the second substrate such that the display region of the second substrate forms a second thickened layer relative to the dummy region, and a thickness of the first thickened layer is less than or equal to a thickness of the second thickened layer;

wherein the first black matrix and the second black matrix are located in different locations, and an orthogonal projection of the first black matrix on the first substrate does not overlap an orthogonal projection of the second black matrix on the first substrate.

2. The display panel according to claim 1, wherein a thickness of the first main post spacer is equal to a thickness of the second main post spacer.

3. The display panel according to claim 1, wherein a sum of a thickness of a display region of the first substrate, a thickness of the first main post spacer, and a thickness of a display region of the second substrate is equal to a sum of a thickness of a dummy region of the second substrate, a thickness of the main post spacer, and the thickness of a dummy region of the second substrate.

4. The display panel according to claim 1, wherein the post spacer layer further comprises at least one first auxiliary post spacer disposed in the display region and/or at least one second auxiliary post spacer disposed in the dummy region; a thickness of the first auxiliary post spacer is less than a thickness of the first main post spacer, and a thickness of the second auxiliary post spacer is less than a thickness of the second main post spacer.

5. The display panel according to claim 1, wherein the post spacer layer is disposed on the first substrate or disposed on the second substrate.

6. A display panel, defined with a display region, an encapsulation region, and a dummy region located between the display region and the encapsulation region, comprising:
  a first substrate comprising a first black matrix disposed in the display region and a second black matrix disposed in the dummy region, wherein a thickness of the second black matrix is greater than a thickness of the first black matrix such that the dummy region of the first substrate forms a first thickened layer relative to the display region;
  a second substrate disposed opposite to the first substrate; and
  a post spacer layer, wherein the post spacer layer is disposed between the first substrate and the second substrate, and comprises at least one first main post spacer disposed in the display region and at least one second main post spacer disposed in the dummy region;
  wherein the display panel further comprises a color resist layer, the color resist layer is disposed on the first substrate and is disposed with the first black matrix on a same layer, a thickness of the color resist layer is greater than a thickness of the first black matrix such that the color resist layer forms a third thickened layer relative to the first black matrix, and a thickness of the first thickened layer is less than or equal to a thickness of the third thickened layer;
  wherein the first black matrix and the second black matrix are located in different locations, and an orthogonal projection of the first black matrix on the first substrate does not overlap an orthogonal projection of the second black matrix on the first substrate.

7. The display panel according to claim 6, wherein a thickness of the first main post spacer is equal to a thickness of the second main post spacer.

8. The display panel according to claim 6, wherein a sum of a thickness of a display region of the first substrate, a thickness of the first main post spacer, and a thickness of a display region of the second substrate is equal to a sum of a thickness of a dummy region of the second substrate, a thickness of the main post spacer, and the thickness of a dummy region of the second substrate.

9. The display panel according to claim 6, wherein the post spacer layer further comprises at least one first auxiliary post spacer disposed in the display region and/or at least one second auxiliary post spacer disposed in the dummy region; a thickness of the first auxiliary post spacer is less than a thickness of the first main post spacer, and a thickness of the second auxiliary post spacer is less than a thickness of the second main post spacer.

10. The display panel according to claim 6, wherein the post spacer layer is disposed on the first substrate or disposed on the second substrate.

11. A display panel, defined with a display region, an encapsulation region, and a dummy region located between the display region and the encapsulation region, and comprising:
  a first substrate comprising a first black matrix disposed in the display region and a second black matrix disposed in the dummy region, wherein a thickness of the second black matrix is greater than a thickness of the first black matrix such that the dummy region of the first substrate forms a first thickened layer relative to the display region; and
  a second substrate disposed opposite to the first substrate;
  wherein the first black matrix and the second black matrix are located in different locations, and an orthogonal projection of the first black matrix on the first substrate does not overlap an orthogonal projection of the second black matrix on the first substrate.

12. The display panel according to claim 11, wherein the display panel comprises a color resist layer, and the color resist layer is disposed in the display region.

13. The display panel according to claim 12, wherein the color resist layer is disposed in the display region of the second substrate such that the display region of the second substrate forms a second thickened layer relative to the dummy region.

14. The display panel according to claim 13, wherein a thickness of the first thickened layer is less than or equal to a thickness of the second thickened layer.

15. The display panel according to claim 12, wherein the color resist layer is disposed on the first substrate and is disposed with the first black matrix on a same layer, a thickness of the color resist layer is greater than a thickness of the first black matrix such that the color resist layer forms a third thickened layer relative to the first black matrix.

16. The display panel according to claim 15, wherein a thickness of the first thickened layer is less than or equal to a thickness of the third thickened layer.

17. The display panel according to claim 11, wherein the display panel further comprises a post spacer layer, the post spacer layer is disposed between the first substrate and the second substrate and comprises at least one first main post spacer disposed in the display region and at least one second main post spacer disposed in the dummy region.

18. The display panel according to claim 17, wherein a thickness of the first main post spacer is equal to a thickness of the second main post spacer.

19. The display panel according to claim 17, wherein a sum of a thickness of a display region of the first substrate, a thickness of the first main post spacer, and a thickness of a display region of the second substrate is equal to a sum of a thickness of a dummy region of the second substrate, a thickness of the main post spacer, and the thickness of a dummy region of the second substrate.

20. The display panel according to claim 17, wherein the post spacer layer is disposed on the first substrate or disposed on the second substrate.

\* \* \* \* \*